(12) United States Patent
Nagar et al.

(10) Patent No.: US 12,105,657 B2
(45) Date of Patent: Oct. 1, 2024

(54) USER SIGNALS FOR DATA TRANSMISSION OVER A BUS INTERFACE PROTOCOL

(71) Applicant: Intel Corporation, Santa Clara, CA (US)

(72) Inventors: Krishna Kumar Nagar, Union City, CA (US); Brandon Lewis Gordon, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 752 days.

(21) Appl. No.: 17/133,954

(22) Filed: Dec. 24, 2020

(65) Prior Publication Data

US 2021/0117359 A1 Apr. 22, 2021

(51) Int. Cl.
*G06F 13/40* (2006.01)
*G06F 1/12* (2006.01)

(52) U.S. Cl.
CPC ............ *G06F 13/4027* (2013.01); *G06F 1/12* (2013.01)

(58) Field of Classification Search
CPC ............................. G06F 13/4027; G06F 1/12
USPC .................................................. 710/314, 66
See application file for complete search history.

(56) References Cited

U.S. PATENT DOCUMENTS

| | | | | |
|---|---|---|---|---|
| 4,611,279 A * | 9/1986 | Andresen | ............... | G06F 13/282 713/400 |
| 4,999,828 A * | 3/1991 | Pollen | ................ | G11B 20/1809 |
| 5,181,201 A * | 1/1993 | Schauss | ................ | G06F 13/128 370/359 |
| 5,182,752 A * | 1/1993 | DeRoo | ..................... | G06F 11/08 714/E11.032 |
| 5,345,562 A * | 9/1994 | Chen | ...................... | G06F 13/368 710/110 |
| 5,809,543 A * | 9/1998 | Byers | .................. | G06F 11/1666 711/120 |
| 5,872,776 A * | 2/1999 | Yang | .................. | H04B 1/71052 370/441 |
| 5,974,091 A * | 10/1999 | Huff | .................. | H03M 13/4107 714/796 |
| 6,185,637 B1 * | 2/2001 | Strongin | ................. | G06F 13/28 710/60 |
| 6,707,474 B1 * | 3/2004 | Beck | .................. | G01R 31/3177 702/68 |
| 9,529,686 B1 * | 12/2016 | Arbel | ....................... | G06F 11/10 |
| 11,496,418 B1 * | 11/2022 | Blair | ....................... | H04L 49/15 |
| 2002/0152436 A1 * | 10/2002 | O'Dea | ............... | G11B 20/1833 714/811 |
| 2004/0202147 A1 * | 10/2004 | Hakkinen | ............. | H04W 76/27 370/351 |
| 2008/0084862 A1 * | 4/2008 | Oliver | ................... | G06F 13/385 370/350 |
| 2012/0159088 A1 * | 6/2012 | Balkan | ................ | G06F 13/1668 711/147 |

(Continued)

OTHER PUBLICATIONS

AMBA AXI and ACE Protocol Specification (Year: 2011).*

*Primary Examiner* — Paul R. Myers
(74) *Attorney, Agent, or Firm* — Fletcher Yoder, P.C.

(57) ABSTRACT

Bus interface protocols allow users to transmit data from one IP to another. Allowing definition of multiple per-symbol and per-packet user signals allows users to append information with each segment of data or transmit additional information pertaining to the whole packet of data, respectively. This provides finer granularity and control over the information.

20 Claims, 6 Drawing Sheets

(56) References Cited

U.S. PATENT DOCUMENTS

| | | | |
|---|---|---|---|
| 2012/0266048 A1* | 10/2012 | Chung | G06F 11/10 |
| | | | 714/768 |
| 2013/0195210 A1* | 8/2013 | Swarbrick | G06F 13/423 |
| | | | 375/259 |
| 2013/0272192 A1* | 10/2013 | Chang | H04L 1/1822 |
| | | | 370/328 |
| 2014/0348077 A1* | 11/2014 | Chen | H04L 25/0202 |
| | | | 370/329 |
| 2015/0095866 A1* | 4/2015 | Cohen | G01R 31/318335 |
| | | | 716/113 |
| 2015/0154093 A1* | 6/2015 | Probyn | G06F 11/221 |
| | | | 714/37 |
| 2015/0339424 A1* | 11/2015 | Chang | G06F 30/00 |
| | | | 716/136 |
| 2016/0048423 A1* | 2/2016 | Williams | G06F 11/1004 |
| | | | 714/819 |
| 2016/0062830 A1* | 3/2016 | Cha | G11C 11/1659 |
| | | | 714/764 |
| 2016/0124890 A1* | 5/2016 | Thompson | G06F 13/4252 |
| | | | 710/113 |
| 2016/0364343 A1* | 12/2016 | Case | G06F 12/145 |
| 2020/0092133 A1* | 3/2020 | Quakernack | H04L 12/40032 |
| 2021/0011636 A1* | 1/2021 | Atsatt | G06F 8/45 |
| 2021/0026787 A1* | 1/2021 | Motoyama | G06F 12/1483 |

* cited by examiner

USER SIGNALS FOR DATA TRANSMISSION OVER A BUS INTERFACE PROTOCOL

BACKGROUND

The present disclosure relates generally to digital communication using bus interface protocols. Bus interface protocols like Avalon Memory Mapped Interface (Avalon-MM) and Advanced Microcontroller Bus Architecture Advanced Extensible Interface 4 (AMBA-AXI4) enable users to transmit data from one component to another. However, there may be a limited number of properties that can be defined using these protocols. Indeed, these bus interface protocols may not allow users to transmit additional information regarding the nature or boundary of the data. For example, for transmitting certain information (e.g., error correcting code (ECC) or cyclic redundancy check (CRC) information), users may resort to utilizing the data bus itself. This usage of the bus presents challenges in encoding and decoding data.

The AMBA-AXI4 protocol defines user signals, but the user signals correspond to the data bus and have no facilities to demarcate signals within the vector. User signals in AXI are defined for a data bus. This is disadvantageous because the user signals cannot be used for data segments within the protocol definition. Also, up-conversion and down-conversion may not be possible with user signals in AXI. Furthermore, multiple user signals cannot be defined for one data channel in AXI. Thus, in such protocols, a single bus with complex encoding may be used to transmit multiple pieces of sideband data.

BRIEF DESCRIPTION OF THE DRAWINGS

Advantages of the disclosure may become apparent upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B.

Certain aspects commensurate in scope with the originally claimed disclosure are set forth below. It should be understood that these aspects are presented merely to provide the reader with a brief summary of certain forms of the disclosure. Indeed, the disclosure may encompass a variety of aspects that may not be set forth below.

The present disclosure relates to methods and systems that enable definition of multiple user signals on an interface between devices via one or more data buses. The user signals may be optional sideband signals that flow along with data. A receiving device may deem a user signal valid when the data is valid. With this definition, a role or purpose for the bits used in a user signal may be defined for receiving devices. The role may include a string, flag, and/or or other indicator used to describe the functionality of the user signal.

An advantage to enabling multiple user signals is that multiple user signals may facilitate transmission of a multitude of information without implementing or amending complex encoding/decoding schemes for the data signals. The complex encoding/decoding schemes are avoided by appending the information to data symbols and/or data packets. Sideband data appended to data symbols may be referred to as "per-symbol" user signals, and sideband data appended to data packets may be referred to as "per-packet" user signal.

Sideband data transmitted on a per-packet or per-symbol basis provides finer granularity and control over the transmission and use of information than possible using non-demarcated user signals. Furthermore, using the sideband transmission, the data may be up-converted or down-converted without information loss or corruption. This per-symbol and per-packet definition allows a system integration tool (e.g., the Platform Designer system integration tool in Intel® Quartus® by INTEL CORPORATION) to connect signals between master devices and slave devices that support the transported information while terminating other connections that are not common between communicating interfaces.

As described above, interface communications may include a per-symbol user signal. As the name suggests, per-symbol user signal (symbol_user) is defined per data symbol. In some communications, each data symbol may have a user signal associated with it. For example, if a number of data symbols in a transmission is a number X (e.g., 8), and the width of the symbol_user is Y (e.g., 3) clock cycles or bits, a total width of the data will be X*Y (e.g., 24) bits.

As previously noted, the symbol_user may be valid when the associated data is valid. In some transmissions, the symbol_user may be deemed invalid if the associated data symbol is invalid. The source/receiving device may change this signal up to every cycle when the data is valid. A sink/receiving device may disregard the value of symbol_user bits for empty symbols. Also, the devices (or their programmable designs running on them) may define how a signal is to be terminated if it is no appropriate connection exists between devices. If a source device with this signal is connected to a sink device that does not have this signal on its interface, the signal from source may remain dangling in the generated interconnect. If a source device that does not have this signal is connected to a sink device that has this signal on its interface, the sink device's input user signal may be terminated as specified by the device/design for the device. If both the source and sink devices have equal numbers of data symbols in transmissions, then the user signal for both devices may have equal widths. In some embodiments, if both the source and sink devices have different numbers of data symbols, they may or may not be prohibited from interfacing with the user signals.

Figure 1:
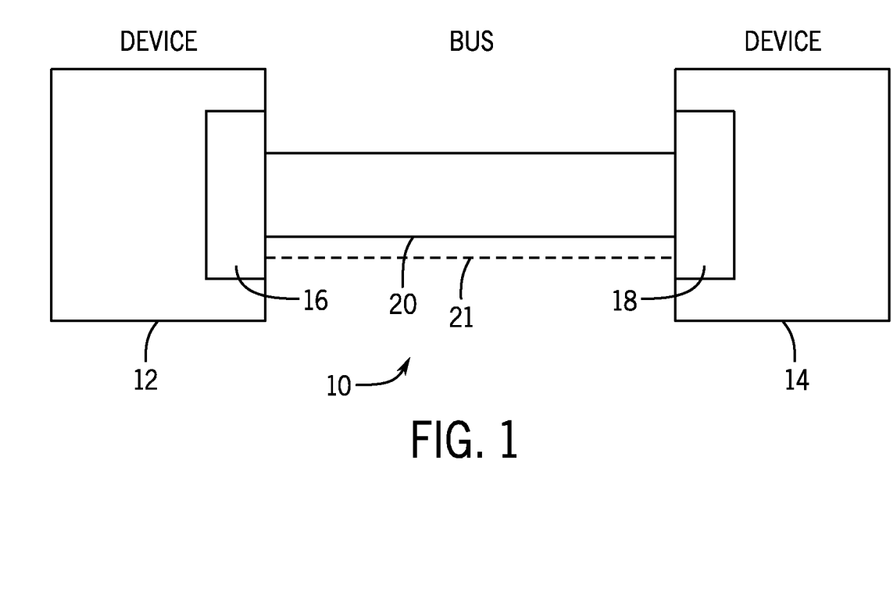
FIG. 1 is a block diagram of electronic devices communicating via one or more buses, in accordance with an embodiment of the disclosure.

Referring to FIG. 1, system 10 illustrates an electronic device 12 and an electronic device 14 that may communicate via respective interfaces 16 and 18 that communicate over one or more buses 20. The electronic device 12 may include one or more die or other semiconductor devices. As illustrated, the interface 16 enables the electronic device 12 to format data and communicate with the electronic device 14 over one or more interconnection types via the one or more buses 20. For instance, the interface 16 may enable the electronic device 12 to communicate using microbumps, controlled collapse chip connection (C4) bumps, wirebonds, silicon bridges, vias, and/or other interconnection types. The electronic device 14 may include one or more die and/or other semiconductor devices. Additionally, the electronic device 14 may include an interface 18. The interface 18 may enable the electronic device 14 to communicate using microbumps, controlled collapse chip connection (C4) bumps, wirebonds, silicon bridges, vias, and/or other interconnection types. Using the interfaces 16 and 18, the electronic devices 12 and 14 may transfer data between each other using the one or more buses 20. In some embodiments, the one or more buses 20 may include a user signal bus 21. Additionally or alternatively, the user signal bus 21 may be separate from the one or more buses 20. The one or more buses 20 and the user signal bus 21 may include any medium through which the interfaces 16 and 18 may connect, such a silicon bridges, wires, trace, vias, and/or any other suitable medium through which the interfaces 16 and 18 may connect. As discussed herein, the interfaces 16 and 18 may be used to transmit data signals over the one or more buses 20 and to append user signals along with the data signals transmitted over the one or more buses 20 and/or the user signal bus 21.

Figure 2:
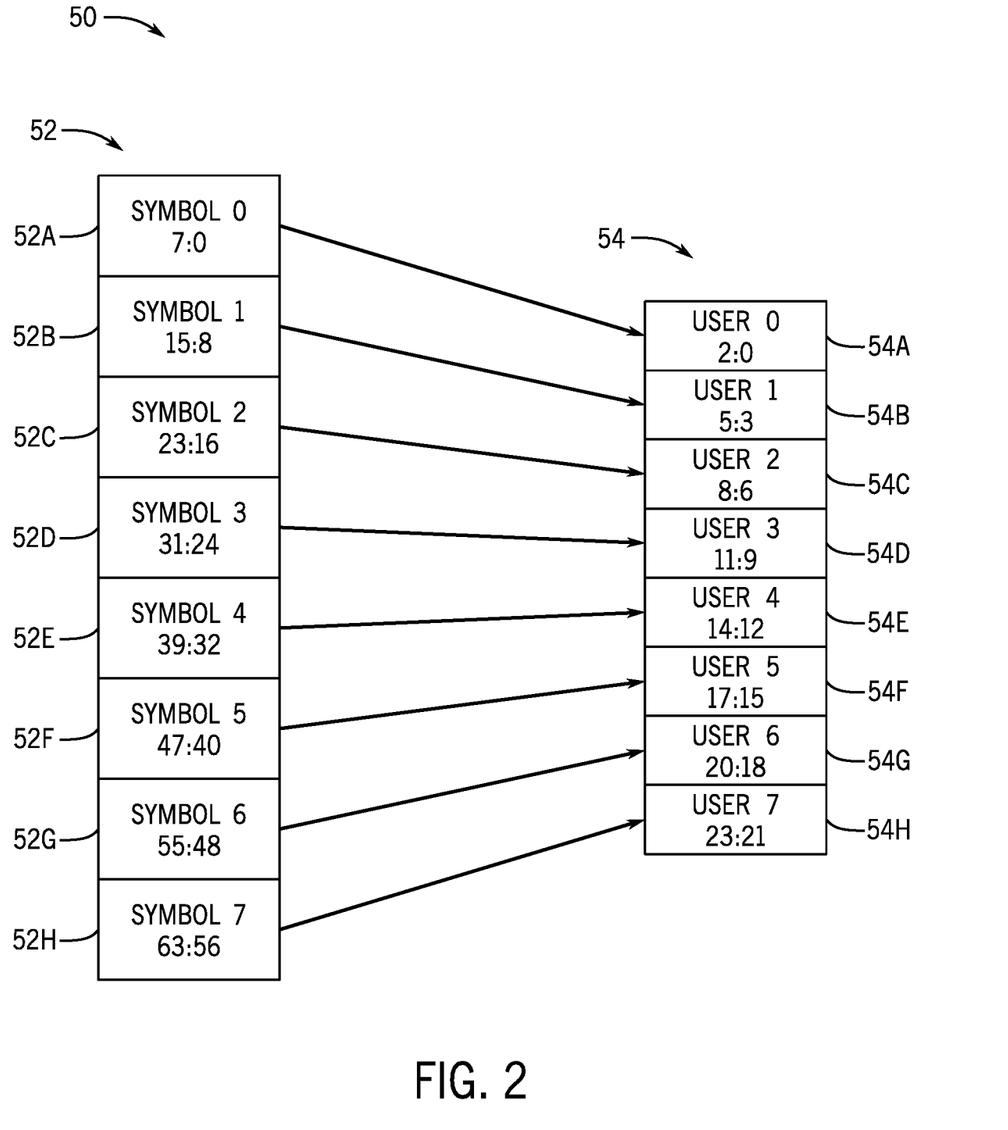
FIG. 2 is a block diagram illustrating data symbols and their corresponding user signals, in accordance with an embodiment of the disclosure.

FIG. 2 is a block diagram 50 illustrating a segment of data symbols 52 and their associated per-symbol user signal (i.e., symbol_user) 54. The data symbols 52 may be transmitted over the one or more buses 20, while the per-symbol user signals may be transmitted over the one or more buses 20 and/or the user signal bus 21 as described in FIG. 1. Individual data symbols 52A, 52B, 52C, 52D, 52E, 52F, 52G, and 52H collectively form the data symbols 52. Although the illustrated embodiment of the data symbols 52 each include eight bits, other embodiments may include more or fewer bits, such as two bits, four bits, sixteen bits, and the like. Each data symbol 52 may be associated with a corresponding per-symbol user signal 54. Individual per-symbol user signals 54A, 54B, 54C, 54D, 54E, 54F, 54G, and 54H collectively form the per-symbol user signals 54. Although the illustrated embodiment of the user signals 54 includes three bits, giving a total width of twenty-four bits of user signal, other embodiments may include more or fewer bits, such as one bit, two bits, four bits, or more bits for each of the per-symbol user signals 54. As illustrated, each of the data symbols 52 may have a corresponding per-symbol user signal 54. However, in some embodiments, some data symbols 52 may be unaccompanied by a per-symbol user signal 54. For instance, a format may be defined between the interfaces 16 and 18 that specifies which data symbols 52 are to be accompanied by the per-symbol user signals 54.

Figure 3:
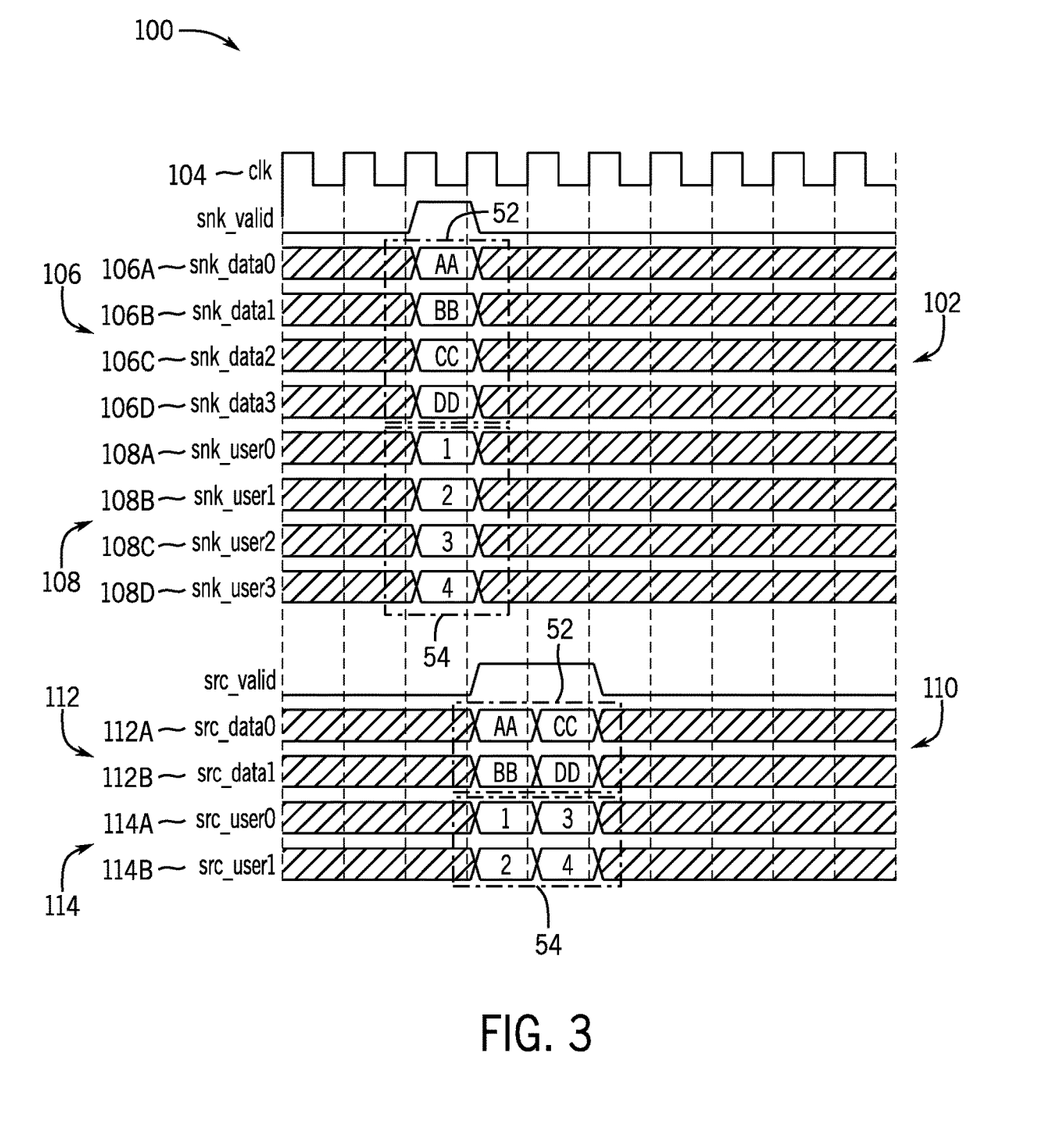
FIG. 3 is a timing diagram illustrating per-symbol user signals converted from a source feeding into a sink with a greater number of data lines, in accordance with an embodiment of the disclosure.

FIG. 3 is timing diagram 100 that illustrates a connection of a source 110 to a sink 102. As illustrated, the sink 102 has a greater number of sink data lines 106 (i.e., sink data lines 106A, 106B, 106C, and 106D) than the source 110 has source data lines 112 (i.e., source data lines 112A and 112B) to communicate the data signals. Similarly, the sink 102 has a greater number of user sink lines 108 (i.e., user sink lines 108A, 108B, 108C, and 108D) than the source 110 has user source lines 114 (i.e., user source lines 114A and 114B) used to communicate the per-symbol user signals 54. The timing diagram 100 also illustrates a clock signal 104. As can be seen, each data symbol 52 of the source data lines 112 has a corresponding per-symbol user signal 54 of the user source lines 114. Similarly, each data symbol 52 of the sink data lines 106 has a corresponding per-symbol user signal 54 of the user sink lines 108.

In certain embodiments, both the sink 102 and the source 110 may have an equal number of per-symbol user signals 54 associated with each data symbol 52. In such embodiments, the interfaces 16 and 18 may maintain the ratio of bits of user signal 54 to the data symbols 52 using the interfaces 16 and 18. For example, the sink 102 and the source 110 may both have four data symbols 52 and four corresponding per-symbol user signals 54. However, if the source 110 has two source data lines 112 while the sink 102 has four sink data lines 106, the interfaces 16 and 18 may translate the two source data lines 112 to the sink data lines 106 that use half as many clock cycles to intake the data symbols 52 than the source data lines 112 uses to transmit the data symbols 52. Similar translations of the per-symbol user signals 54 may be made due to twice as many user lines being used by the sink 102 than are used by the source 110.

In certain embodiments, the number of data symbols 52 in source data lines 112 may be different from the number of data symbols 52 in the sink data lines 106. A data format adapter (e.g., the interfaces 16 and 18) may convert the number of data symbols 52 in the source data lines 112 having a first number to the sink data lines 106 having a second number of symbols. The interfaces 16 and 18 (or the interconnections therebetween) adjust the width of the per-symbol user signal accordingly. For example, the source 110 may have four data symbols 52 in the source data lines 112 and two bits of per-symbol user signal 54 in the user source lines 114 associated with each source data symbol 52. Thus, there would be eight bits of total user signal in user source lines 114. However, the sink 102 connected to the source 110 may have sixteen data symbols 52 in sink data lines 106. The interfaces 16 and 18 may then convert the four data symbols 52 in the source data lines 112 to sixteen data symbols 52 in the sink data lines 106. To maintain the ratio of the per-symbol user signal 54 associated with the data symbols 52, the per-symbol user signals 54 in the user source lines 114 may then be converted from eight bits to thirty-two bits of per-symbol user signal 54 in the user sink lines 108. This translation by the interfaces 16 and 18 preserves the two bits of per-symbol user signal 54 associated with each data symbol 52.

Figure 4:
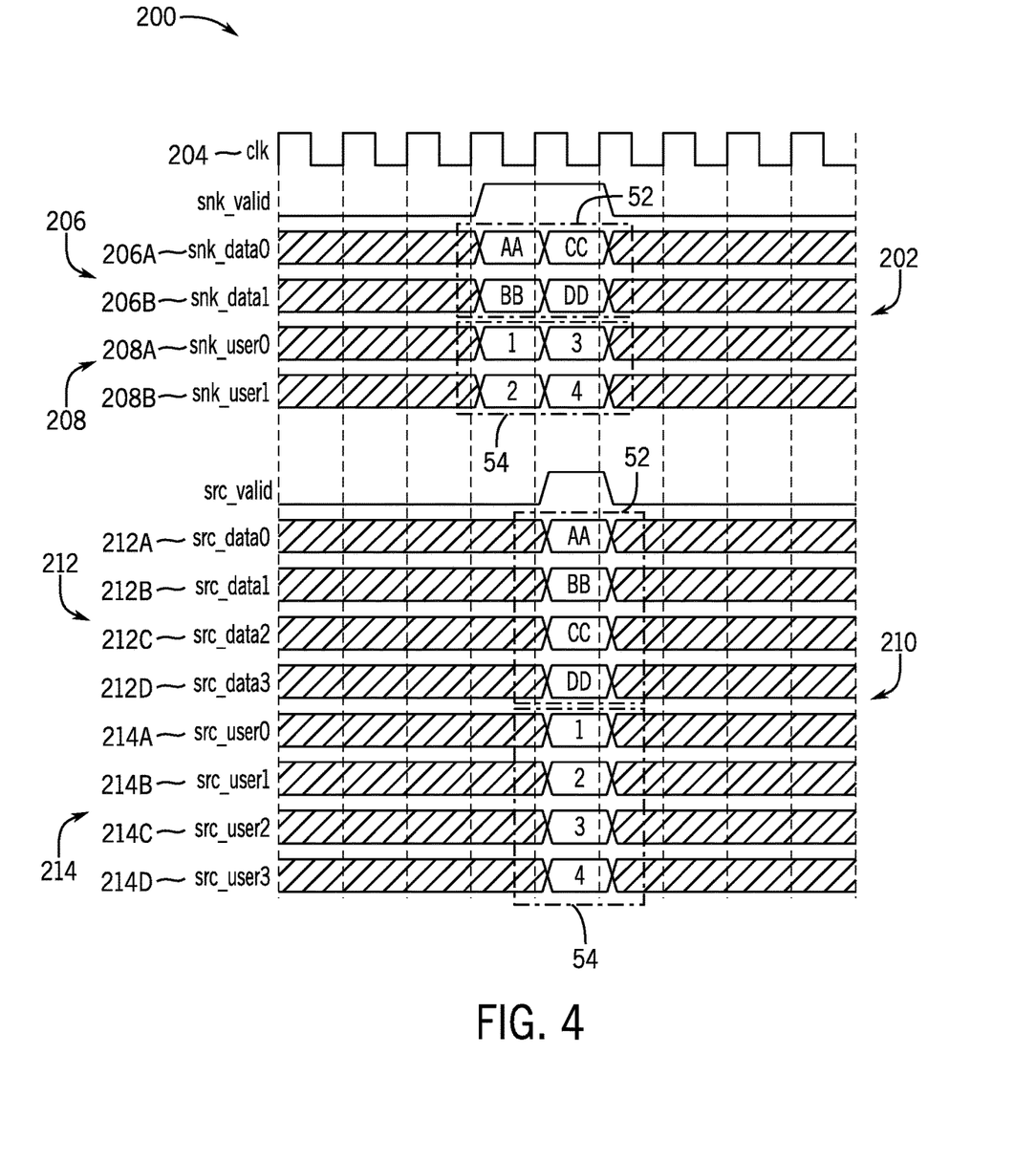
FIG. 4 is a timing diagram illustrating per-symbol user signals converted from a source feeding into a sink with a lesser number of data lines, in accordance with an embodiment of the disclosure.

FIG. 4 is a timing diagram 200 in which the source 210 has a greater number of source data lines 212 (i.e., source data lines 212A, 212B, 212C, and 212D) than a sink 202 has sink data lines 206 (i.e., sink data lines 206A and 206B) to communicate the data signals. Similarly, the source 210 has a greater number of user source lines 214 (i.e., user source lines 214A, 214B, 214C, and 214D) than the sink 202 has user sink lines 208 (i.e., user sink lines 208A and 208B) used to communicate the per-symbol user signals 54. The timing diagram 200 also illustrates a clock 204. As can be seen, each data symbol 52 of the source data lines 212 has a corresponding per-symbol user signal 54 of the user source lines 214.

In certain embodiments, both the sink 202 and the source 210 may have an equal number of per-symbol user signal 54 associated with each data symbol 52. As the source 210 has a greater number of the source data lines 212 than the sink 202 in timing diagram 200, when the interfaces 16 and 18 translate the data from the source 210 to the sink 202, they may lengthen the cycle of clock 204 accordingly. For example, the source 210 may have four source data lines 212 (i.e., source data lines 212A, 212B, 212C, and 212D) of data symbols 52, and four corresponding user source lines 214 (i.e., user source lines 214A, 214B, 214C, and 214D) of per-symbol user signal 54. The sink 202 may have only two sink data lines 206 (i.e., sink data lines 206A and 206B) of the data symbols 52 and two user sink lines 208 (i.e., user sink lines 208A and 208B) of the per-symbol user signal 54. To transmit data from the source 210 to the sink 202, the interfaces 16 and 18 may translate the four source data lines 212 to the sink data lines 206 that use twice as many clock cycles to intake the data symbols 52 than the source data lines 212 use to transmit the signal. Similarly, the interfaces 16 and 18 may translate the four user source lines 214 to the user sink lines 208 that use twice as many clock cycles to intake the per-symbol user signals 54 than the user source lines 214 use.

As with the sink 102 and the source 110 in the timing diagram 100, the number of data symbols 52 in the source data lines 212 may be different from the number of data symbols 52 in the sink data lines 206. In such embodiments, the interfaces 16 and 18 may convert the number of data symbols 52 in the source 210 to the number of data symbols in the sink 202. The interfaces 16 and 18 may then adjust the width of the per-symbol user signal 54 to preserve the ratio of per-symbol user signal 54 to data symbol 52.

Figure 5:
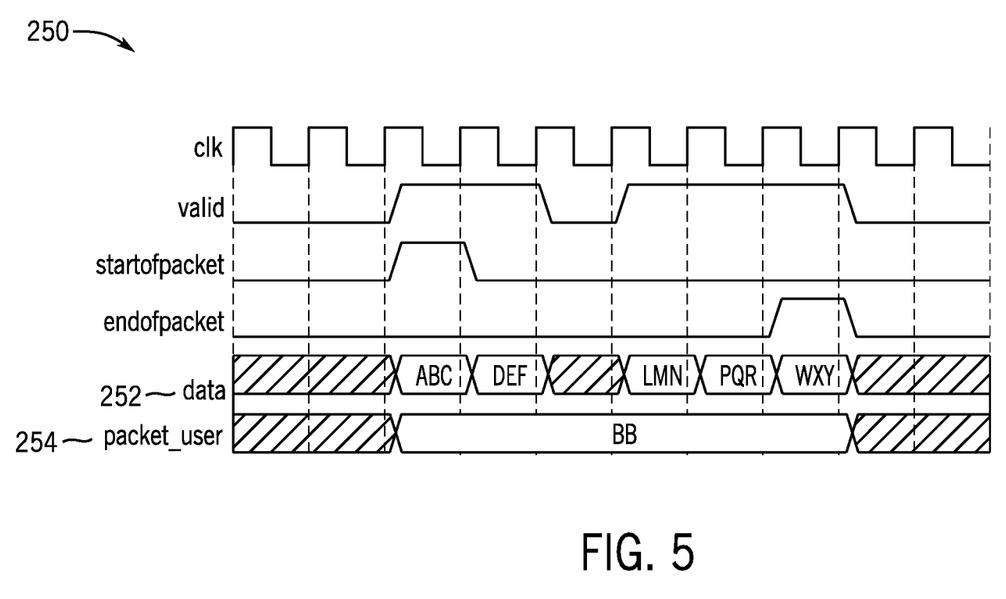
FIG. 5 is a timing diagram illustrating characteristics of per-packet user signals, in accordance with an embodiment of the disclosure.

FIG. 5 illustrates a timing diagram 250 for a per-packet user signal 254 (packet_user) rather than the per-symbol user signal 54. The per-packet user signal 254 may be transmitted over the user signal bus 21 and/or the one or more buses 20. The per-packet user signal 254 may be of any suitable width. Unlike the per-symbol user signal 54, the per-packet user signal 254 may remain constant throughout the packet. In other words, the width may be set at the start of the data packet 252 and may remain the same until the end of the data packet 252. The per-packet user signal 254 need not be modified when one or more buses 20 is subjected to any width adaptions. With width adaption, the data packet 252 may lengthen or shorten as the adaption dictates while the data remains contained within the single data packet 252. In some embodiments, a width of the per-packet user signal 254 may lengthen or shorten with the width adaption of the packet. Alternatively, the per-packet user signal 254 may remain a same length regardless of the width adaption applied to the packet. Like the per-symbol user signals 54, the per-packet user signals 254 also may be assigned a defined role in order to describe the function of the per-packet user signal 254 and to facilitate connectivity within a system integration tool (e.g., the Platform Designer system integration tool in Intel® Quartus® by INTEL CORPORATION).

Figure 6:
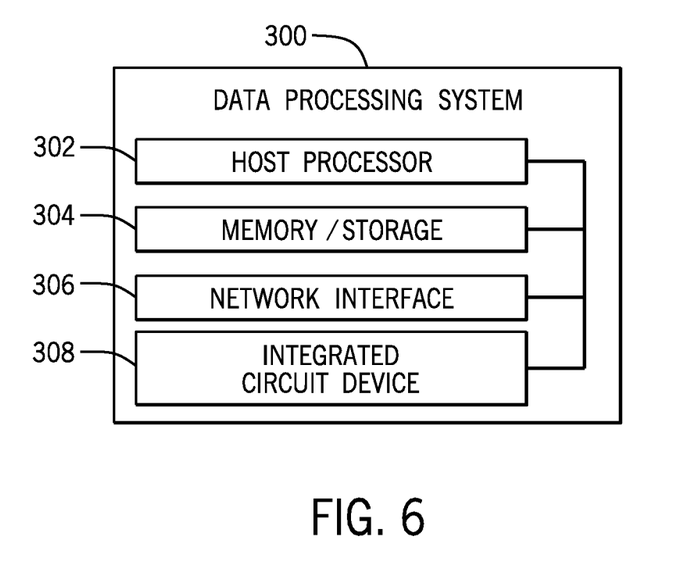
FIG. 6 is a block diagram of a data processing system wherein the devices and bus interface protocols may be implemented of the disclosure.

The electronic devices 12 and 14 may be a number of devices, including integrated circuit devices, such as integrated circuit device 308 shown in FIG. 6. The integrated circuit device 308 may be an application-specific integrated circuit (ASIC) or a field-programmable gate array (FPGA). The integrated circuit device 308 may be, or may be a component of, a data processing system, such as the data processing system 300. The data processing system 300 may include a host processor 302, memory and/or storage circuitry 304, and a network interface 306. The data processing system 300 may include more or fewer components (e.g., electronic display, user interface structures, or ASICs). The host processor 302 may include any suitable processor, such as an INTEL® Xeon® processor or a reduced-instruction processor (e.g., a reduced instruction set computer (RISC), or an Advanced RISC Machine (ARM) processor) that may manage a data processing request for the data processing system 300 (e.g., to perform machine learning, video processing, voice recognition, image recognition, data compression, database search ranking, bioinformatics, network security pattern identification, spatial navigation, or the like). The memory and/or storage circuitry 304 may include random access memory (RAM), read-only memory (ROM), one or more hard drives, flash memory, or the like. The memory and/or storage circuitry 304 may hold data to be processed by the data processing system 300. In some cases, the memory and/or storage circuitry 304 may also store configuration programs (bitstreams) for programming the integrated circuit device 308. The network interface 306 may allow the data processing system 300 to communicate with other electronic devices. The data processing system 300 may include several different packages or may be contained within a single package on a single package substrate.

In one example, the data processing system 300 may be part of a data center that processes a variety of different requests. For instance, the data processing system 300 may receive a data processing request via the network interface 306 to perform machine learning, video processing, voice recognition, image recognition, data compression, database search ranking, bioinformatics, network security pattern identification, spatial navigation, or some other specialized task. The host processor 302 may cause the programmable logic fabric of the integrated circuit device 308 to be programmed with a multiplier suitable to implement a requested task. For instance, the host processor 302 may instruct that a configuration data (bitstream) stored on the memory and/or storage circuitry 304 to be programmed into the programmable logic fabric of the integrated circuit device 308. The configuration data (bitstream) may represent a set of circuit designs that may be mapped to and packed together in the programmable logic according to the techniques described herein. By efficiently mapping and packing the circuit designs, the area, latency, and/or routing resources used to perform the requested task may be reduced on the integrated circuit device 308.

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS

The following numbered clauses define certain example embodiments of the present disclosure.

EXAMPLE EMBODIMENT 1. A system comprising:
one or more data buses;
one or more user buses;
processing circuitry of a first electronic device configured to process or generate data; and
a first interface of the first electronic device configured to communicate with a second electronic device having a second interface using the data, wherein the first interface and the second interface enable the first electronic device and the second electronic device to:
send or receive the data over the one or more data buses in a plurality of data symbols; and
send or receive user signals over the one or more user buses, wherein each user signal corresponds to a respective data symbol of the plurality of data symbols.

EXAMPLE EMBODIMENT 2. The system of example embodiment 1, wherein each data symbols correspond to a respective user signal.

EXAMPLE EMBODIMENT 3. The system of example embodiment 1, wherein at least one or more data symbols have no respective user signal associated therewith.

EXAMPLE EMBODIMENT 4. The system of example embodiment 3, wherein a next data symbol after a data symbol having no associated user signal is aligned to a next user signal associated with the next data symbol.

EXAMPLE EMBODIMENT 5. The system of example embodiment 1, wherein the one or more user buses are bundled with the one or more data buses into a single bus group in an interconnection medium between the first electronic device and the second electronic device.

EXAMPLE EMBODIMENT 6. The system of example embodiment 1, wherein the second electronic device has separate connections for each of the one or more user buses.

EXAMPLE EMBODIMENT 7. The system of example embodiment 1, wherein the second electronic device is operable to receive less user signals via the one or more user buses than a transmission from the first interface in a first clock cycle.

EXAMPLE EMBODIMENT 8. The system of example embodiment 7, wherein the one or more user buses holds the transmission from the first interface for at least two clock cycles.

EXAMPLE EMBODIMENT 9. The system of example embodiment 1, wherein the second electronic device is operable to receive more user signals via the one or more user buses than the first interface transmits in a first clock cycle.

EXAMPLE EMBODIMENT 10. The system of example embodiment 9, wherein the first interface sends a first part of the user signals in the first clock cycle and sends a second part of the user signals and corresponding data symbols in a second clock cycle.

EXAMPLE EMBODIMENT 11. The system of example embodiment 1, wherein each of the plurality of data symbols each have a first number of bits.

EXAMPLE EMBODIMENT 12. The system of example embodiment 11, wherein the each of the user signals each have a second number of bits.

EXAMPLE EMBODIMENT 13. The system of example embodiment 12, wherein the first number is different than the second number.

EXAMPLE EMBODIMENT 14. A system comprising:
one or more data buses;
one or more user buses;
a first die comprising a first interface, wherein the first interface transmits:
data over the one or more data buses in data symbols; and
user signals over the one or more user buses, wherein the user signals are aligned to respective data symbols in the data; and
a second die comprising a second interface, wherein the second interface receives:
the data over the one or more data buses in the data symbols; and
the user signals over the one or more user buses.

EXAMPLE EMBODIMENT 15. The system of example embodiment 14, wherein the first interface comprises more lines coupled to the one or more data buses than the second interface has coupled to one or more data lines, and the one or more data buses hold at least a portion of the data for multiple clock cycles.

EXAMPLE EMBODIMENT 16. The system of example embodiment 14, wherein the first interface comprises more lines coupled to the one or more user buses than the second interface has coupled to one or more user lines, and the one or more user buses hold at least a portion of the user signals for multiple clock cycles.

EXAMPLE EMBODIMENT 17. The system of example embodiment 14, wherein the first interface comprises more lines coupled to the one or more data buses than the second interface has coupled to one or more data lines, and the first interface transmits a first portion of the data in a first clock cycle and a second portion of the data in a second clock cycle.

EXAMPLE EMBODIMENT 18. The system of example embodiment 14, wherein the first interface comprises more lines coupled to the one or more user buses than the second interface has coupled to one or more user lines, and the first interface transmits a first portion of the user signals in a first clock cycle and a second portion of the user signals in a second clock cycle.

EXAMPLE EMBODIMENT 19. A system comprising
a first electronic device comprising a first interface, wherein the first interface transmits:

data over one or more data buses in data symbols encoded into a data packet; and a user signal over a user bus, wherein the user signal is aligned to the data packet in a sideband communication; and a second device comprising a second interface, wherein the second interface receives:

the data over the one or more data buses in the data packet; and the user signal over the user bus.

EXAMPLE EMBODIMENT 20. The system of example embodiment 19, wherein the first interface is configured to adapt a width of a user packet, and a duration of the user signal changes by a same change that a width of the data packet undergoes during the width adaption.

What is claimed is:

1. A system comprising:
one or more data buses;
one or more user buses;
processing circuitry of a first electronic device configured to process or generate data;
a first interface of the first electronic device configured to communicate with a second electronic device having a second interface using the data; and
the second electronic device operable to receive more user signals via the one or more user buses than the first interface transmits in a first clock cycle, and wherein the first interface and the second interface enable the first electronic device and the second electronic device to:
send or receive the data over the one or more data buses in a plurality of data symbols; and
send or receive user signals over the one or more user buses, wherein each user signal corresponds to a respective data symbol of the plurality of data symbols.

2. The system of claim 1, wherein each data symbols correspond to a respective user signal.

3. The system of claim 1, wherein at least one or more data symbols have no respective user signal associated therewith.

4. The system of claim 3, wherein a next data symbol after a data symbol having no associated user signal is aligned to a next user signal associated with the next data symbol.

5. The system of claim 1, wherein the one or more user buses are bundled with the one or more data buses into a single bus group in an interconnection medium between the first electronic device and the second electronic device.

6. The system of claim 1, wherein the second electronic device has separate connections for each of the one or more user buses.

7. The system of claim 1, wherein the second electronic device is operable to receive fewer user signals via the one or more user buses than a transmission from the first interface in a first clock cycle.

8. The system of claim 7, wherein the one or more user buses holds the transmission from the first interface for at least two clock cycles.

9. The system of claim 1, wherein the first interface sends a first part of the user signals in the first clock cycle and sends a second part of the user signals and corresponding data symbols in a second clock cycle.

10. The system of claim 1, wherein each of the plurality of data symbols each have a first number of bits.

11. The system of claim 10, wherein the each of the user signals each have a second number of bits.

12. The system of claim 11, wherein the first number is different than the second number.

13. A system comprising:
one or more data buses;
one or more user buses;
a first die comprising a first interface, wherein the first interface transmits:
data over the one or more data buses in data symbols; and
user signals over the one or more user buses, wherein the user signals are aligned to respective data symbols in the data; and
a second die comprising a second interface operable to receive more user signals via the one or more user buses than the first interface transmits in a first clock cycle, wherein the second interface receives:
the data over the one or more data buses in the data symbols; and
the user signals over the one or more user buses.

14. The system of claim 13, wherein the first interface comprises more lines coupled to the one or more data buses than the second interface has coupled to one or more data lines, and the one or more data buses hold at least a portion of the data for multiple clock cycles.

15. The system of claim 13, wherein the first interface comprises more lines coupled to the one or more user buses than the second interface has coupled to one or more user lines, and the one or more user buses hold at least a portion of the user signals for multiple clock cycles.

16. The system of claim 13, wherein the first interface comprises more lines coupled to the one or more data buses than the second interface has coupled to one or more data lines, and the first interface transmits a first portion of the data in the first clock cycle and a second portion of the data in a second clock cycle.

17. The system of claim 13, wherein the first interface comprises more lines coupled to the one or more user buses than the second interface has coupled to one or more user lines, and the first interface transmits a first portion of the user signals in a first clock cycle and a second portion of the user signals in a second clock cycle.

18. A system comprising
a first electronic device comprising a first interface, wherein the first interface transmits:
data over one or more data buses in data symbols encoded into a data packet; and
a user signal over a user bus, wherein the user signal is aligned to the data packet in a sideband communication; and
a second device comprising a second interface, wherein the second interface receives:
the data over the one or more data buses in the data packet; and
the user signal over the user bus, wherein the second device is operable to receive more user signals over the user bus than the first interface transmits in a clock cycle.

19. The system of claim 18, wherein the first interface is configured to adapt a width of a user packet, and a duration of the user signal changes by a same change that a width of the data packet undergoes during the width adaption.

20. The system of claim 18, wherein the first interface comprises more lines coupled to the one or more data buses than the second interface has coupled to one or more data lines.

* * * * *